March 12, 1963 J. M. P. MERRY 3,081,381

TRANSVERSELY SCANNING TRANSDUCER WITH FIXED ELECTROMAGNET AND MOVING POLE PIECES

Filed Dec. 31, 1953

INVENTOR
JOHN M. P. MERRY
BY
Byerly, Townsend & Watson
ATTORNEYS

United States Patent Office 3,081,381

Patented Mar. 12, 1963

3,081,381

TRANSVERSELY SCANNING TRANSDUCER WITH FIXED ELECTROMAGNET AND MOVING POLE PIECES

John M. P. Merry, Seaford, N.Y., assignor to News Syndicate Co., Inc., New York, N.Y., a corporation of New York Filed Dec. 31, 1953, Ser. No. 401,470
5 Claims. (Cl. 179—100.2)

This invention relates to apparatus for making and reproducing a high-frequency magnetic tape record. A particular object of the invention is to provide apparatus for making a magnetic tape record of a television program.

In recording sound signals having a maximum frequency of about 15 kc., it is customary to use tape speeds of about seven and one-half inches per second to draw the tape across a recording and reproducing head having a gap of a width of .00025 inch. The frequency of television signals is about four megacycles which would require a tape speed of 2000 inches per second which is entirely impracticable from a mechanical viewpoint. In accordance with my invention, this difficulty is avoided by moving the gap of the recording head across a traveling tape at a high speed so as to produce a magnetic record in the form of narrow bands extending transversely across the tape. In this way, the relative speed of the gap and tape may be made as much as 2000 inches per second with tape speeds small enough to introduce no mechanical difficulty.

In the usual apparatus for magnetic tape sound recording, the tape is drawn across a so-called recording head which may also serve as a pick-up for reproducing the sound record. The usual recording head consists essentially of an electro-magnet whose core is extended into two pole pieces separated by a small gap. The tape may be drawn across the gap or through the gap. The former arrangement which leads to longitudinal magnetization of the tape is the customary one.

In accordance with my invention, the recording head or pick-up is divided into two parts. One of these is the electromagnet and its core. The other consists of a pair of pole pieces providing the usual gap between them. The pole pieces are mounted for rapid movement of the gap across the traveling tape, while the electromagnet is stationary and fixed in such position that it creates a magnetic flux through the pole pieces and across the gap during the travel of the gap across the tape. Most desirably, I provide a considerable number of pairs of pole pieces which travel across the tape successively, each pair being brought under the influence of the electromagnet during the short period of time during which it is crossing the tape. In this way, I am able to obtain very rapid relative movement between the gaps and the tape, while using a stationary electromagnet to cause the flux across the gaps.

In the form of my apparatus which I consider most desirable, pairs of pole pieces providing gaps are mounted around the periphery of a wheel which lies in a plane perpendicular to the path of the traveling tape so that rotation of the wheel carries the pole pieces with their gaps successively across the traveling tape. Each pole piece of each pair is provided with an outward extension or tail piece at each side of the wheel, while the core of the electromagnet of the recording head contains in its two ends transverse slots which receive the tails of the pole pieces of each pair while the gap of that pair is traveling across the tape. Thus, the flux of the electromagnet is directed across each traveling gap during the period in which the gap is moving across the tape.

In order that my invention may clearly be understood, I will describe in detail the specific apparatus embodying it which is shown in the accompanying drawings in which:

FIG. 1 is a partially diagrammatic side view of the entire apparatus;

FIG. 2 is a side view of a part of the peripheral portion of the wheel showing the pole pieces mounted thereon;

FIG. 3 is an enlarged section on the line 3—3 of FIG. 2;

Figure 4:
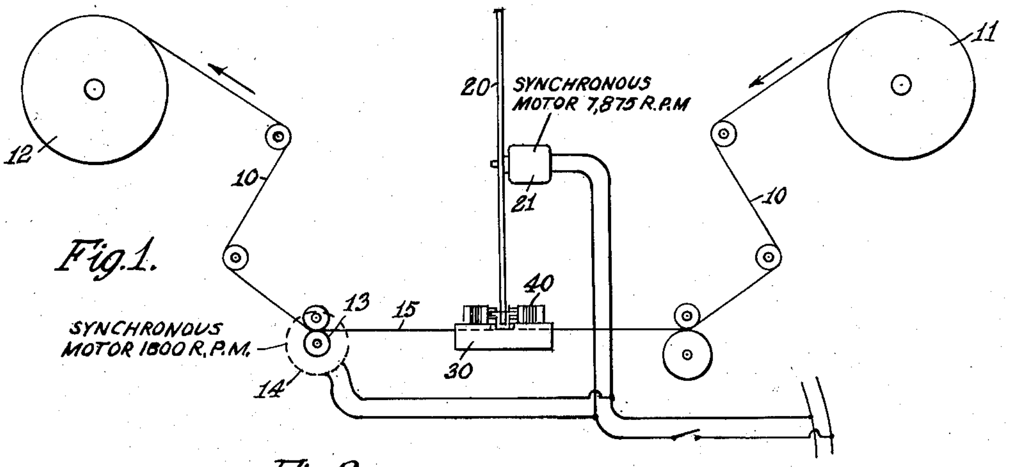
FIG. 4 is a perspective view of a pair of the pole pieces mounted on the periphery of the wheel.
Figure 5:
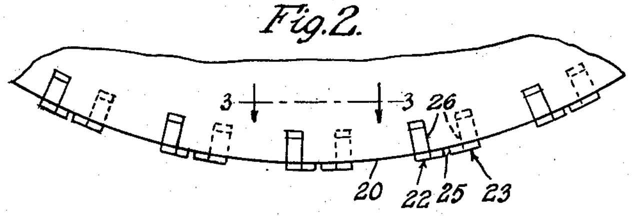
FIG. 5 is an enlarged vertical section on the line 5—5 of FIG. 6 showing the lower portion of the wheel, the electromagnet and the tape shaper.

The apparatus includes a traveling tape 10 drawn in the usual way from a supply reel 11 to a take-up wheel 12 at a speed controlled by a capstan 13 driven by a synchronous motor 14.

A disc-shaped wheel 20 is mounted on the shaft of a synchronous motor 21 which is driven from the same source of alternating current as the motor 14 but at a much higher speed. The wheel 20 is positioned in a plane perpendicular to a reach 15 of the tape 10 with its lower edge close to the tape. Around the periphery of the wheel 20 are mounted pole pieces 22, 23 of magnetic material such as powdered iron. The form of the pole pieces may best be seen in FIG. 4 which shows that their inner ends 24 are separated to provide a gap 25. The size of the gap is greatly exaggerated in the drawings for clearness. Actually, the gap has a width of .00025 inch like the gaps used in the recording heads of ordinary tape recorders designed for sound recording. Like the gaps of such recorders, the gap 25 is most desirably filled with a non-magnetic material such as plastic, so that the pole pieces and gaps present a smooth surface to the tape. It should be noted that the gaps 25 extend across the periphery of the wheel so that, when the wheel is rotated, the gaps extend transversely to the direction of the relative movement between them and the tape.

Each pole piece is provided with a spacing part 26 extending along one side of the wheel and an outer end 27 projecting outwardly from one side of the wheel. The projections 27 of the two pole pieces 22, 23 of each pair of pole pieces extend outwardly from opposite sides of the wheel 20.

Figure 6:
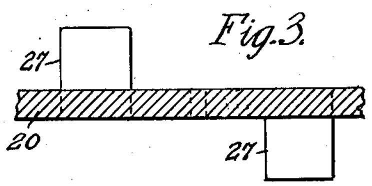
FIG. 6 is a vertical section on the line 6—6 of FIG. 5 showing the same parts.

Under the wheel, the tape 10 extends through a shaper 30 which is a block of non-magnetic material containing a slot 31, lying in a cylindrical surface coaxial with the wheel 20. At one of its side edges, the slot 31 is turned slightly downward from its cylindrical surface as shown in FIG. 6 so as to eliminate danger of the pole pieces catching on the edge of the tape. A slot 32 across the top of the shaper 30 opening into the slot 31 permits the pole pieces on the periphery of the wheel to cross the shaper with their gaps 25 in contact with the tape.

The electromagnet 40 is mounted on the shaper. In the form illustrated, it consists of two wire coils 41, 42. The coil 41 is wound about a core consisting of two plates 43 of magnetic material. These plates are curved in cylindrical surfaces coaxial with the wheel and are held in position in a block of plastic material 44 and separated by a plastic spacer 44'. The inner edges of the plates 43 project out from one end of the coil 41 toward the wheel 20. The coil 42 is similarly associated with curved core plates 45. As the wheel 20 rotates, the projections 27 of the pole pieces 22 pass through the slot provided between the core pieces 43 and the projections 27 of the pole pieces 23 pass between the core pieces 45.

The clearance between the projections 27 of the pole pieces and the core pieces 43, 45 of the electromagnet should be made as small as is practicable without danger of contact and friction between them. I find, however, that a clearance as great as 1/32 inch may be allowed without interferring with the flow of magnetic flux from the core pieces through the pole pieces. This is because the opposed surfaces of the projections 27 and the core pieces 43, 45 are of much greater area than the opposed front ends of the pole pieces which form the gap 25.

Figure 7:
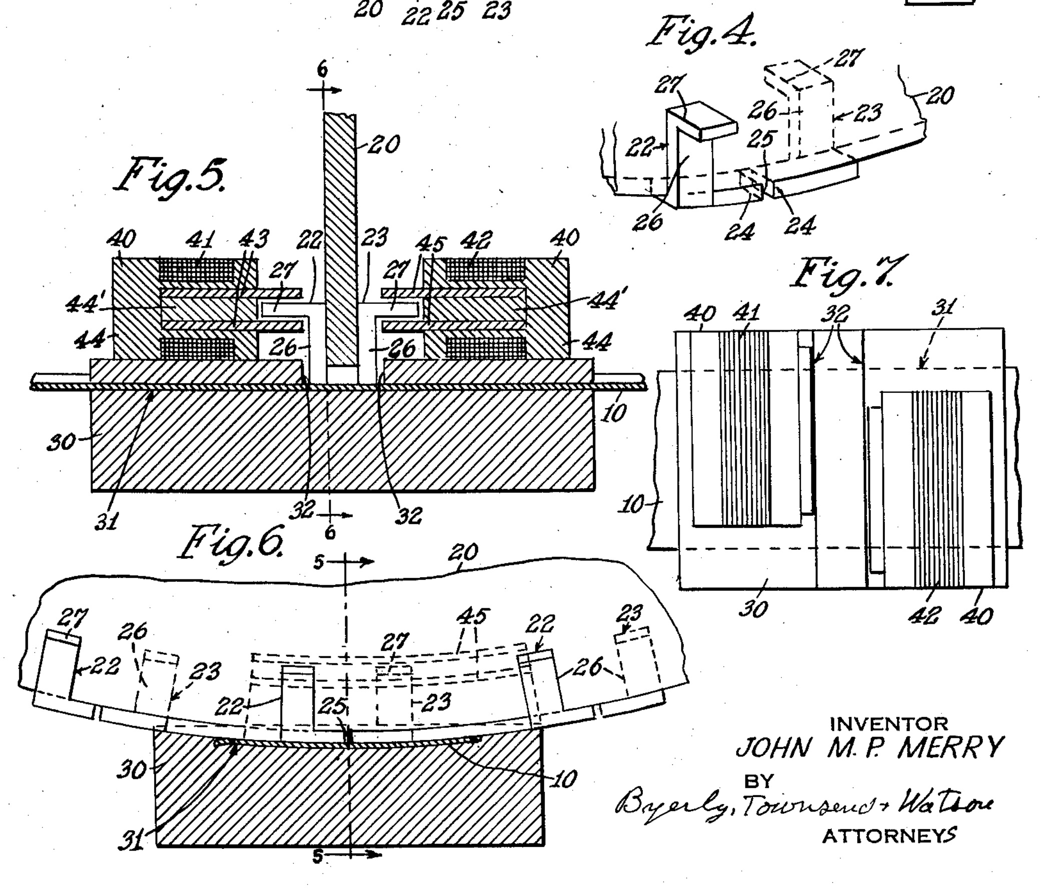
FIG. 7 is a top view of the electromagnet and tape shaper with the wheel and pole pieces omitted.

The two halves of the electromagnet 40 are located in such a way that the projections 27 of each pair of pole pieces enter between the core pieces 43 and 45 just as the gap 25 between the core pieces reaches the edge of the tape and move out from between the core pieces just as the gap leaves the other edge of the tape. This requires offsetting the two halves of the electromagnet as shown in FIG. 7.

The spacing of the gaps 25 around the periphery of the wheel 20 is equal to the width of the tape 10 so that, as one gap passes off the tape, the next gap passes onto the tape, making the recording continuous.

In using the device which has been described for recording, a signal current is fed to the coils 41, 42 of the electromagnet, while the tape is drawn upon the take-up roll 12 at a speed determined by the synchronous motor 14, and the wheel 20 is rotated at a speed determined by the synchronous motor 21. The signal fed to the coils 41, 42 may be a composite TV signal including a video signal and supersync and blanking pulses. Choice may be exercised in the exact speeds used, but it is to be noted that, in order to make full use of the tape and at the same time to avoid overlapping of parts of the record, the ratio between the linear speed of the gaps on the periphery of the wheel and the linear speed of the tape should be substantially equal to the ratio between the width of the pole pieces and the width of the tape.

As an example of a convenient relationship for recording television signals, the tape may be one inch wide and the wheel may have a circumference of 15 inches with fifteen pairs of pole pieces, each 1/32 inch in width. The tape may be given a linear speed of 61.5 inches per second by giving the motor 14 a speed of 1800 r.p.m. and making the capstan 13 0.635 inch in diameter, and the wheel a peripheral speed of 1968.75 inches per second by making the speed of the synchronous motor 7,875 r.p.m. This gives a relative movement between the tape and the gaps sufficient to resolve a signal of approximately 3.9 mc. Greater resolution can be obtained by increasing the wheel speed with a proportional increase in the rate of travel of the tape.

In using the device for the reproduction of a recorded television program, the tape and wheel speeds are the same as those used in recording the program. In this case, the electromagnet 40 serves as a pick-up for the record which has been made on the tape and its coils are accordingly connected to the output.

While the apparatus is intended primarily for recording television programs, it is desirable also for high fidelity audio recording. It permits such recording at very low tape speeds and provides for a very much longer playing sound record on a given tape than that which can be obtained in the ordinary tape recording apparatus.

The specific apparatus which has been described produces what is termed "longitudinal" magnetization of the tape, that is, magnetization in the plane of the tape. Longitudinal magnetization has in general been found preferable to perpendicular magnetization in tape recording. It should be noted, however, that the apparatus described may easily be adapted to perpendicular recording. To obtain such recording, it is necessary merely to substitute single downwardly directed pole pieces for the pairs of pole pieces on the wheel and to provide a stationary pole piece extending across the underside of the tape. In this case, one-half the electromagnet may be of the form which has been described, while the other half may have its core directly connected to the stationary pole piece under the tape.

What I claim is:

1. The combination with a traveling magnetizable tape, of an electromagnet fixed near the path of the tape and having a wide core containing a slot parallel to the surface of the tape, a movable pole piece having a small end and a wide portion, and means for moving the pole piece so that its small end travels across the tape while its wide portion travels through the slot in the core of the magnet.

2. The combination with a traveling magnetizable tape, of a plurality of pairs of pole pieces, each pair having opposed relatively narrow inner ends providing a gap and relatively wide outer ends, means for moving said pairs of pole pieces one after another across the tape so that their gaps traverse narrow transverse areas of the tape, and a fixed electromagnet having a wide core with an extended surface located to lie close to the wide outer ends of each pair of pole pieces while the gap between them is crossing the tape.

3. The combination with a traveling magnetizable tape, of a plurality of pairs of pole pieces, each pair having opposed relatively narrow inner ends providing a gap and relatively wide outer ends, means for moving said pairs of pole pieces one after another across the tape so that their gaps traverse narrow transverse areas of the tape, and a fixed electromagnet having a wide core containing a slot parallel to the surface of the tape and positioned to receive the outer ends of each pair of pole pieces while the gap between them is crossing the tape.

4. The combination with a traveling magnetizable tape, of means for shaping a portion of the tape into a cylindrically curved surface having an axis parallel to the tape at some distance from it, an electromagnet located near the curved portion of the tape and having a wide core containing a cylindrically curved slot coaxial with the curved portion of the tape, a disc-shaped wheel having its axis coincident with the axes of the curved portion of the tape and the slot in the core, and pairs of pole pieces providing gaps around the periphery of the wheel which cross the curved portion of the tape as the wheel rotates and having wide projections which travel through the slot in the core as the wheel rotates.

5. The combination with a traveling magnetizable tape, of means for shaping a portion of the tape into a cylindrically curved surface having an axis parallel to the tape at some distance from it, a disc-shaped wheel having its axis coincident with the axis of the curved portion of the tape, electromagnets located at opposite sides of the wheel and each having a wide core containing a cylindrically curved slot whose axis is coincident with that of the wheel, and pairs of pole pieces mounted on the wheel providing gaps around the periphery of the wheel which cross the curved portion of the tape as the wheel rotates and having wide projections at opposite sides of the wheel which travel through the slots in the cores while the gaps cross the tape.

References Cited in the file of this patent

UNITED STATES PATENTS

| | | |
|---|---|---|
| 1,011,322 | Clement | Dec. 12, 1911 |
| 2,188,650 | Clark | Jan. 30, 1940 |
| 2,245,286 | Marzocchi | June 10, 1941 |
| 2,560,474 | Potts | July 10, 1951 |
| 2,632,061 | Begun | Mar. 17, 1953 |
| 2,743,318 | De Forest | Apr. 24, 1956 |
| 2,773,120 | Masterson | Dec. 4, 1956 |
| 3,020,356 | Barry | Feb. 6, 1962 |